(12) United States Patent
Morita

(10) Patent No.: US 7,876,461 B2
(45) Date of Patent: Jan. 25, 2011

(54) IMAGE PROCESSING APPARATUS, CONTROL METHOD THEREFOR, AND CONTROL PROGRAM

(75) Inventor: Naoki Morita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 480 days.

(21) Appl. No.: 12/037,456

(22) Filed: Feb. 26, 2008

(65) Prior Publication Data

US 2008/0212827 A1 Sep. 4, 2008

(30) Foreign Application Priority Data

Mar. 2, 2007 (JP) ............................. 2007-052920

(51) Int. Cl.
*G06K 15/00* (2006.01)
*G06F 3/02* (2006.01)
*G06F 11/08* (2006.01)
*H04N 1/40* (2006.01)

(52) U.S. Cl. ................... 358/1.14; 358/1.18; 358/1.13; 358/3.23; 358/3.28; 714/100; 714/1

(58) Field of Classification Search ............... 358/3.23, 358/3.28, 1.14, 1.18, 1.13; 714/100, 1
See application file for complete search history.

(56) References Cited

U.S. PATENT DOCUMENTS

| | | | | |
|---|---|---|---|---|
| 6,914,691 B1 * | 7/2005 | Sato | ........................ | 358/1.15 |
| 7,095,514 B1 * | 8/2006 | Yamagata et al. | .......... | 358/1.14 |
| 7,571,323 B2 * | 8/2009 | Iwamura et al. | ............. | 713/176 |
| 7,609,396 B2 * | 10/2009 | Harada | ........................ | 358/1.1 |
| 7,639,820 B2 * | 12/2009 | Saito | ........................... | 380/287 |
| 2003/0025929 A1 * | 2/2003 | Fukushima | ................ | 358/1.14 |
| 2004/0148507 A1 | 7/2004 | Iwamura et al. | ............. | 713/176 |
| 2005/0151990 A1 * | 7/2005 | Ishikawa et al. | ........... | 358/1.14 |
| 2006/0007471 A1 * | 1/2006 | Okamoto et al. | ........... | 358/1.14 |
| 2007/0247652 A1 * | 10/2007 | Akahori | .................... | 358/1.13 |
| 2008/0018942 A1 * | 1/2008 | Komiya | .................... | 358/3.28 |
| 2008/0151288 A1 * | 6/2008 | Matsunoshita | ............. | 358/1.15 |
| 2008/0163364 A1 * | 7/2008 | Ferlitsch | ..................... | 726/21 |

FOREIGN PATENT DOCUMENTS

| | | |
|---|---|---|
| JP | 2000-050012 | 2/2000 |
| JP | 2004-228897 A | 8/2004 |
| JP | 2006-025256 | 1/2006 |

* cited by examiner

*Primary Examiner*—Twyler L Haskins
*Assistant Examiner*—Jonathan R Beckley
(74) *Attorney, Agent, or Firm*—Fitzpatrick, Cella, Harper & Scinto

(57) ABSTRACT

An image processing apparatus which is capable of extracting embedded information from the back side of a printed document without causing degradation of reading efficiency. A scanner unit reads an image on a first side of a sheet. An encoded information processing section extracts embedded information embedded in the image read by the scanner unit. When embedded information indicating that embedded information is embedded in an image on a second side of the sheet is extracted by the encoded information processing section, an automatic second-side reading section reads the image on the second side of the sheet, and the encoded information processing section extracts the embedded information embedded in the image read by the automatic second-side reading section.

3 Claims, 13 Drawing Sheets

*FIG. 2A* *FIG. 2B*
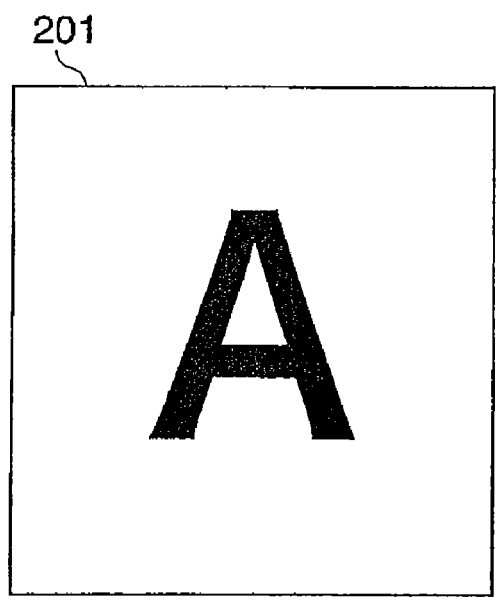
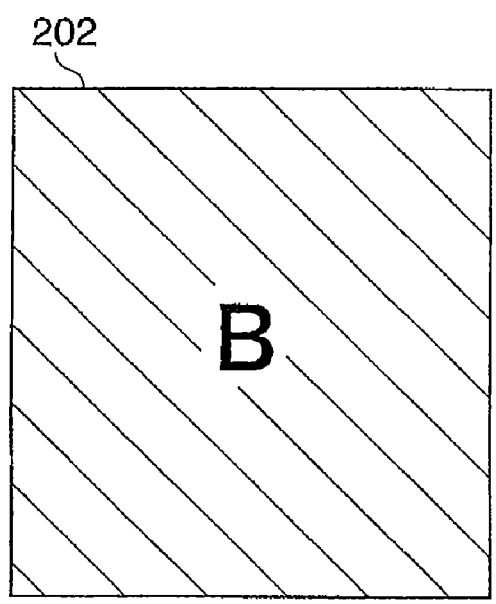

FIG. 9

| AREA | PURPOSE | ANALYSIS SPEED | DATA SIZE |
|---|---|---|---|
| FIRST AREA | INFORMATION FOR REAL-TIME DETECTION, SUCH AS COPY RESTRICTION INFORMATION | SPEED EQUIVALENT TO SCANNING SPEED | SMALL |
| SECOND AREA | INFORMATION FOR NON-REAL-TIME DETECTION, SUCH AS TRACKING INFORMATION | RELATIVELY LOW SPEED | LARGE |

010,111,110,011 = 2,7,6,3

IMAGE PROCESSING APPARATUS, CONTROL METHOD THEREFOR, AND CONTROL PROGRAM

BACKGROUND OF THE INVENTION

1. Field of the Invention

The present invention relates to an image processing apparatus, a control method therefor, and a control program.

2. Description of the Related Art

There has been proposed a technique in which copy restriction information and history information are embedded in a printed document, and a copying operation is restricted based on the embedded information, to thereby maintain the security of the printed document (see e.g. Japanese Laid-Open Patent Publication (Kokai) No. 2004-228897).

However, in order to embed copy restriction information and history information in a printed document, the printed document requires an empty area larger than a predetermined size, where no print image is printed, and when a print image occupies a major portion of a sheet area, it is impossible to secure a sufficient empty area.

To solve this problem, it is envisaged to employ a technique in which embedded information is embedded in the back side of a sheet such that the embedded information can be read by reading images on the respective front and back sides of the sheet before copying.

However, the above-mentioned conventional technique suffers the following problems: When embedded information may be embedded on the back side of a sheet, it is impossible to determine whether or not the embedded information is actually present on the back side of the sheet, simply by reading an image on the front side of the sheet. For this reason, it is absolutely required to read both front-side and back-side images for every sheet, so as to maintain security. Therefore, even when a printed document has no embedded information on the back side thereof and has only a front-side image to be read, it is required to perform double-sided image reading, which causes degradation of reading efficiency.

SUMMARY OF THE INVENTION

The present invention provides an image processing apparatus, a control method therefor, and a control program which are capable of extracting embedded information from the back side of a sheet without causing degradation of reading efficiency.

In a first aspect of the present invention, there is provided an image processing apparatus comprising a first determination unit configured to determine whether or not a first image read from one page indicates that there is information embedded in a second image on another page, a reader unit configured to be operable when it is determined that there is information embedded in the second image on the other page, to read the second image on the other page, a second determination unit configured to determine whether or not there is information embedded in the second image read on the other page read by the reader unit, and a control unit configured to be operable when it is determined by the second determination unit that there is no information embedded, not to permit copying of the first image, and when it is determined by the second determination unit that there is information embedded, to determine based on contents of the information whether or not copying of the first image is to be permitted.

In a second aspect of the present invention, there is provided an image processing apparatus comprising a determination unit configured to determine whether or not a first image read from one page indicates that there is information embedded in a second image on another page, a reader unit configured to be operable when it is determined by the determination unit that there is information embedded in the second image on the other page, to read the second image on the other page, and a control unit configured to be operable when copy-permitting information is not embedded in the second image on the other page read by the reader unit, not to permit copying of the first image, and when the copy-permitting information is embedded in the second image on the other page read by the reader unit, to permit copying of the first image.

In a third aspect of the present invention, there is provided an image processing apparatus comprising a first reader unit configured to read an image on a first page of a recording medium, a first embedded information-extracting unit configured to extract embedded information embedded in the image read by the first reader unit, a second reader unit configured to be operable when embedded information indicating that embedded information is embedded in an image on a second page of the recording medium is extracted by the first embedded information-extracting unit, to read the image on the second page of the recording medium, and a second embedded information-extracting unit configured to extract the embedded information embedded in the image read by the second reader unit.

The image processing apparatus according to the third aspect of the present invention has the first reader unit configured to read an image on the first page of a recording medium and the first embedded information-extracting unit configured to extract embedded information embedded in the image read by the first reader unit. Further, the image processing apparatus has the second reader unit configured to be operable when embedded information indicating that embedded information is embedded in an image on the second page of the recording medium is extracted by the first embedded information-extracting unit, to read the image on the second page of the recording medium. The image processing apparatus also has the second embedded information-extracting unit configured to extract the embedded information embedded in the image read by the second reader unit.

With the arrangement of the image processing apparatus according to the third aspect of the present invention, embedded information is extracted from the second page of a recording medium based on embedded information embedded in the first page of the recording medium. Therefore, it is not always required to read images on the respective two pages of a recording medium, and hence it is possible to extract embedded information from the second page of the recording medium without causing degradation of reading efficiency.

The image processing apparatus comprises a display unit configured to be operable when the embedded information indicating that embedded information is embedded in the image on the second page of the recording medium is extracted by the first embedded information-extracting unit, to prompt a user to cause the image on the second page of the recording medium to be read.

The image processing apparatus comprises a printer unit configured to print the image read by the first reader unit.

The embedded information indicating that embedded information is embedded in the image on the second page of the recording medium can indicate that a side in which the indicating embedded information is embedded is a front side or a back side.

The first embedded information-extracting unit and the second embedded information-extracting unit further extract embedded information for identifying a sheet.

The image processing apparatus further comprises a copy restriction unit configured to be operable when embedded information indicative of copy restriction is extracted by the first embedded information-extracting unit, to stop copying.

The image processing apparatus further comprises a copy restriction removal unit configured to be operable when embedded information indicative of copy restriction is extracted by the first embedded information-extracting unit and at the same time embedded information indicative of a condition for removing the copy restriction is extracted by the second embedded information-extracting unit, to remove the copy restriction if the condition is satisfied.

When the embedded information indicative of a front side or a back side has been extracted by each of the first embedded information-extracting unit and the second embedded information-extracting unit, copying can be permitted only when the embedded information on one page indicates the front side and the embedded information on the other page indicates the back side.

When the embedded information identifying a sheet has been extracted by each of the first embedded information-extracting unit and the second embedded information-extracting unit, copying is permitted only when the embedded information extracted by the first embedded information-extracting unit and the embedded information extracted by the second embedded information-extracting unit indicate an identical sheet.

In a fourth aspect of the present invention, there is provided an image processing apparatus comprising a first reader unit configured to read an image on a first side of a sheet, a first judgment unit configured to judge whether or not embedded information is present in the image read by the first reader unit, a second judgment unit configured to judge whether or not copy restriction information indicative of copy restriction is present in the image read by the first reader unit, a third judgment unit configured to judge whether or not double-sided information indicating that embedded information is present in both sides of the sheet is present in the image read by the first reader unit, a second reader unit configured to be operable when the first judgment unit judges that embedded information is present, the second judgment unit judges that the copy restriction information is present, and the third judgment unit judges that the double-sided information is present, to read an image on a second side of the sheet, a fourth judgment unit configured to judge whether or not embedded information is present in the image read by the second reader unit, a fifth judgment unit configured to judge whether or not copy restriction information indicative of copy restriction is present in the image read by the second reader unit, a sixth judgment unit configured to judge whether or not copy restriction removal information indicative of a condition for removing the copy restriction is present in the image read by the second reader unit, a seventh judgment unit configured to judge whether or not double-sided information indicating that embedded information is present in both sides of the sheet is present in the image read by the second reader unit, a determination unit configured to be operable when the fourth judgment unit judges that embedded information is present, the fifth judgment unit judges that the copy restriction information is present, the sixth judgment unit judges that the copy restriction removal information is present, and the seventh judgment unit judges that the double-sided information is present, to determine based on the copy restriction removal information whether or not copying is permitted, and a copying unit configured to be operable when the determination unit determines that copying is permitted, to perform printing based on the image read by the first reader unit or the second reader unit.

In a fifth aspect of the present invention, there is provided a control method for an image processing apparatus, comprising a first determination step of determining whether or not a first image read from one page indicates that there is information embedded in a second image on another page, a reading step of reading the second image on the other page when it is determined that there is information embedded in the second image on the other page, a second determination step of determining whether or not there is information embedded in the second image read on the other page read in the reading step, and a control step of not permitting copying of the first image when it is determined in the second determination step that there is no information embedded, and determining based on contents of the information whether or not copying of the first image is to be permitted when it is determined in the second determination step that there is information embedded.

In a sixth aspect of the present invention, there is provided a control method for an image processing apparatus, comprising a determination step of determining whether or not a first image read from one page indicates that there is information embedded in a second image on another page, a reading step of reading the second image on the other page when it is determined in the determination step that there is information embedded in the second image on the other page, and a control step of not permitting copying of the first image when copy-permitting information is not embedded in the second image on the other page read in the reading step, and permitting copying of the first image when the copy-permitting information is embedded in the second image on the other page read in the reading step.

In a seventh aspect of the present invention, there is provided a control method for an image processing apparatus, comprising a first reading step of reading an image on a first page of a recording medium, a first embedded information-extracting step of extracting embedded information embedded in the image read in the first reading step, a second reading step of reading an image on a second page of the recording medium, when embedded information indicating that embedded information is embedded in the image on the second page of the recording medium is extracted in the first embedded information-extracting step, and a second embedded information-extracting step of extracting the embedded information embedded in the image read in the second reading step.

In an eighth aspect of the present invention, there is provided a control method for an image processing apparatus, comprising a first reading step of reading an image on a first side of a sheet, a first judgment step of judging whether or not embedded information is present in the image read in the first reading step, a second judgment step of judging whether or not copy restriction information indicative of copy restriction is present in the image read in the first reading step, a third judgment step of judging whether or not double-sided information indicating that embedded information is present in both sides of the sheet is present in the image read in the first reading step, a second reading step of reading an image on a second side of the sheet when it is determined in the first judgment step that embedded information is present, it is determined in the second judgment step that the copy restriction information is present, and it is determined in the third judgment step that the double-sided information is present, a fourth judgment step of judging whether or not embedded information is present in the image read in the second reading step, a fifth judgment step of judging whether or not copy restriction information indicative of copy restriction is present in the image read in the second reading step, a sixth judgment step of judging whether or not copy restriction removal information indicative of a condition for removing the copy restriction is present in the image read in the second reading step, a seventh judgment step of judging whether or not double-sided information indicating that embedded information is present in both sides of the sheet is present in the image read in the second reading step, a determination step of determining based on the copy restriction removal information whether or not copying is permitted, when it is determined in the fourth judgment step that embedded information is present, it is determined in the fifth judgment step that the copy restriction information is present, it is determined in the sixth judgment step that copy restriction removal information is present in the image read in the second reading step, and it is determined in the seventh judgment step that the double-sided information is present, and a copying step of performing printing based on the image read in the first reading step or the second reading step, when it is determined in the determination step that copying is permitted.

In a ninth aspect of the present invention, there is provided a control program for causing a computer to execute a control method for an image processing apparatus, comprising a first reading module for reading an image on a first side of a recording medium, a first embedded information-extracting module for extracting embedded information embedded in the image read by the first reading module, a second reading module for reading an image on a second side of the recording medium operating when embedded information indicating that embedded information is embedded in the image on the second side of the recording medium is extracted by the first embedded information-extracting module, and a second embedded information-extracting module for extracting the embedded information embedded in the image read by the second reading module.

The features and advantages of the invention will become more apparent from the following detailed description taken in conjunction with the accompanying drawings.

BRIEF DESCRIPTION OF THE DRAWINGS

FIG. 2A is a view of an example of the front side of a sheet in the first embodiment.

FIG. 2B is a view of an example of the back side of the sheet in the first embodiment.

FIG. 9 is a table useful in explaining differences in characteristics between a first area and a second area.

DETAILED DESCRIPTION OF THE EMBODIMENTS

The present invention will now be described in detail with reference to the drawings showing preferred embodiments thereof.

Figure 1:
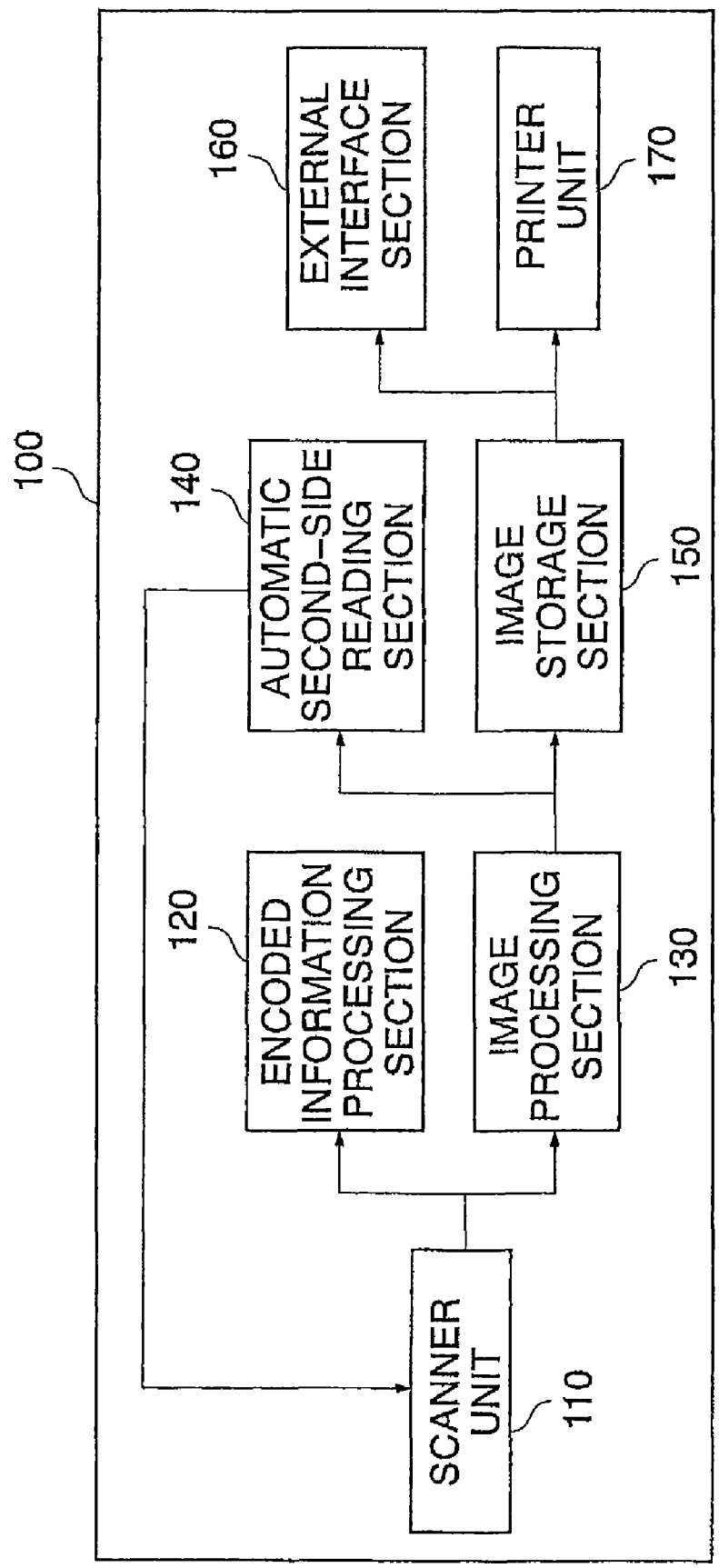
FIG. 1 is a block diagram of the configuration of an image processing apparatus according to a first embodiment of the present invention.

FIG. 1 is a block diagram of the configuration of an image processing apparatus according to a first embodiment of the present invention.

Referring to FIG. 1, the image processing apparatus 100 is configured as below.

A scanner unit 110 reads an image on one side of a recording medium, such as a sheet or an OHP sheet (hereafter, a description will be given by taking a sheet as an example). An encoded information processing section 120 extracts encoded embedded information (hereinafter simply referred to as encoded information) from image data of the read image and analyzes the extracted information. When information to be updated whenever a copying operation is executed, such as history information, is present, the encoded information processing section 120 extracts and updates the information.

An image processing section 130 performs various kinds of processing on the image data of the image read by the scanner unit 110. An automatic second-side reading section 140 automatically inverts the sheet and sets the second side of the same on the scanner unit 110.

An image storage section 150 stores the image data processed by the image processing section 130. An external interface section 160 transmits the image data to an external apparatus. A printer unit 170 prints an image on the sheet based on the image data.

FIGS. 2A and 2B are views illustrating examples of the respective front and back sides of a sheet in the first embodiment.

Referring to FIG. 2A, the front side 201 of the sheet not only has a print image "A" thereon, but also contains encoded information. The encoded information embedded in the front side 201 has a "double-sided flag" indicating that encoded information is also embedded in an opposite side of the sheet from a scanned side of the same. Further, the encoded information has "copy restriction information" indicating that a restriction is imposed on the copying of the sheet. The amount of information contained in the front side 201 is smaller than that in a back side 202 of the sheet.

The back side 202 of the sheet shown in FIG. 2B not only has a print image "B" thereon, but also contains encoded information. The encoded information embedded in the back side 202 has a "double-sided flag" (double-sided information) indicating that encoded information is also embedded in an opposite side of the sheet from a scanned side of the same. Further, the encoded information has "copy restriction information" indicating that a restriction is imposed on the copying of the sheet. Furthermore, the encoded information has "copy restriction detail information" indicative of copy restriction-related detailed information including copy restriction removal information indicative of conditions for removing copy restriction. The amount of information contained in the back side 202 is larger than that in the front side 201.

Although in the present embodiment, each of the front side and the back side has a print image thereon, only one or neither of them may have an image. Further, the encoded information may contain other information than the above-mentioned kinds of information.

Figure 3:
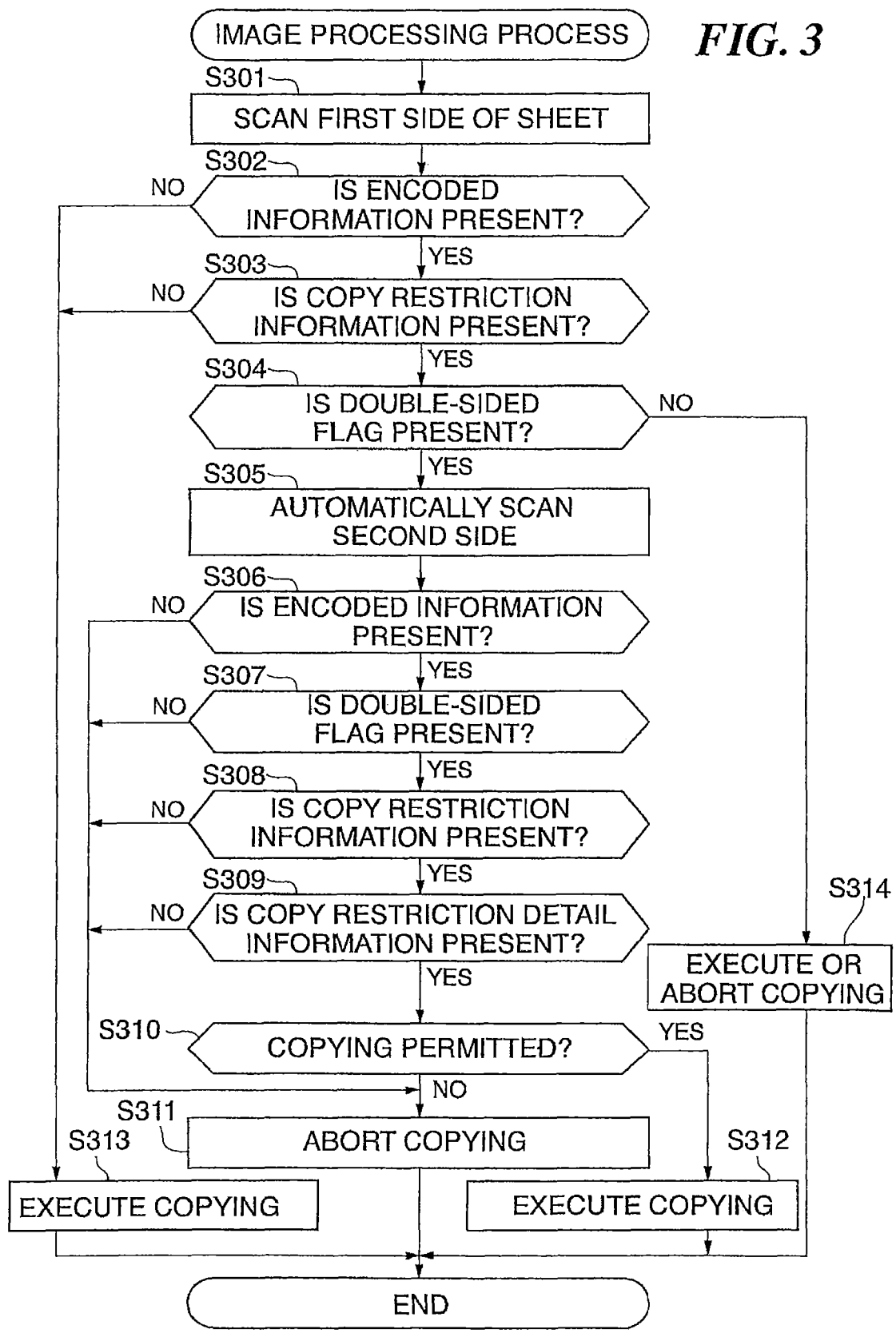
FIG. 3 is a flowchart of an image processing process executed by the image processing apparatus in FIG. 1.

FIG. 3 is a flowchart of an image processing process executed by the image processing apparatus in FIG. 1. Although in the image processing process in FIG. 3, reading of images from both sides of a sheet is eventually executed, it is assumed that before starting this process, the image processing apparatus has been set to a single-sided reading mode.

As shown in FIG. 3, the present process is started in a step S301. In the step S301, the scanner unit 110 scans a first side of a sheet to thereby obtain image data.

In a step S302, the encoded information processing section 120 determines whether or not encoded information is embedded in an image represented by the image data obtained by the scanner unit 110. If no encoded information is contained in the image, the process proceeds to a step S313, whereas if encoded information is contained, the process proceeds to a step S303.

In the step S303, the encoded information processing section 120 extracts the encoded information from the image data and analyzes the extracted encoded information to thereby determine whether or not copy restriction information is contained in the encoded information. If no copy restriction information is contained in the encoded information, the process proceeds to the step S313, whereas if copy restriction information is contained, the process proceeds to a step S304.

In the step S304, the encoded information processing section 120 determines whether or not a double-sided flag is contained in the encoded information. If the double-sided flag is not contained in the encoded information, the process proceeds to a step S314, whereas if the double-sided flag is contained, the process proceeds to a step S305.

In the step S305, the sheet is inverted and set on the scanner unit 110 by the automatic second-side reading section 140, and the scanner unit 110 scans a second side of the sheet to thereby obtain image data.

In a step S306, the encoded information processing section 120 determines whether or not encoded information is embedded in an image on the second side. If no encoded information is contained in the image, the process proceeds to a step S311, whereas if encoded information is contained, the process proceeds to a step S307.

In the step S307, the encoded information processing section 120 determines whether or not a double-sided flag is contained in the encoded information embedded in the image on the second side. If the double-sided flag is not contained in the encoded information, the process proceeds to a step S311, whereas if the double-sided flag is contained, the process proceeds to a step S308.

In the step S308, the encoded information processing section 120 determines whether or not copy restriction information is contained in the encoded information embedded in the image on the second side. If no copy restriction information is contained in the encoded information, the process proceeds to the step S311, whereas if copy restriction information is contained, the process proceeds to a step S309.

In the step S309, the encoded information processing section 120 determines whether or not copy restriction detail information is contained in the encoded information embedded in the image on the second side. If no copy restriction detail information is contained in the encoded information, the process proceeds to the step S311, whereas if copy restriction detail information is contained in the encoded information, the process proceeds to a step S310. That is, while it is determined in the step S306 whether or not there is encoded information embedded in the image on the second side, the determination in the step S308 or S309 is performed based on contents of the encoded information embedded in the image on the second side.

In the step S310, the encoded information processing section 120 refers to the copy restriction information on the first side and the copy restriction information and copy restriction detail information on the second side to thereby determine whether or not copying is permitted. Now, let it be assumed that the copy restriction detail information contains a copy restriction removal condition of removing copy restriction only when the user belongs to a specific department of the company. In this case, if the user belongs to the specific department, it is determined that copying is permitted, whereas if not, it is determined that copying is not permitted. Conditions for the determination may be diversified. If it is determined that copying is not permitted, the process proceeds to a step S311, whereas if copying is permitted, the process proceeds to a step S312.

In the step S311, copying of the sheet is aborted, and the user is notified of the abortion of copying via an operating panel or the like.

In the step S312, copying of the sheet is executed. The image data is stored in the image storage section 150 by execution of copying of the sheet, and then is sent to the external interface section 160 or the printer unit 170. The image data sent to the external interface section 160 is delivered to an external computer. On the other hand, when the image data is sent to the printer unit 170, an image is printed based on the image data. When the copy restriction information and the copy restriction detail information indicate that double-sided copying is permitted, double-sided copying is executed. When the copy restriction information and the copy restriction detail information indicate that only front-side copying is permitted, only front-side copying is executed. Then, the present process is terminated.

In a case where an image on the first side contains the double-sided flag, whatever copy settings are configured by the user, double-sided scanning is performed. Further, Nin1 processing (consolidate copy for copying a plurality of images on one side) is canceled based on the copy restriction information.

In the step S313, since no encoded information is contained in the image, or since copying is not restricted though encoded information is contained in the image, copying of the sheet is executed. When the user has set double-sided copying, double-sided copying is performed, while when the user has set single-sided copying, single-sided copying is performed. Then, the present process is terminated.

In the step S314, since embedding of encoded information in both sides of the sheet, as proposed by the present invention, is not effected, the copying or the cancellation of copying is executed based on the copy restriction information. Then, the present process is terminated.

Figure 4:
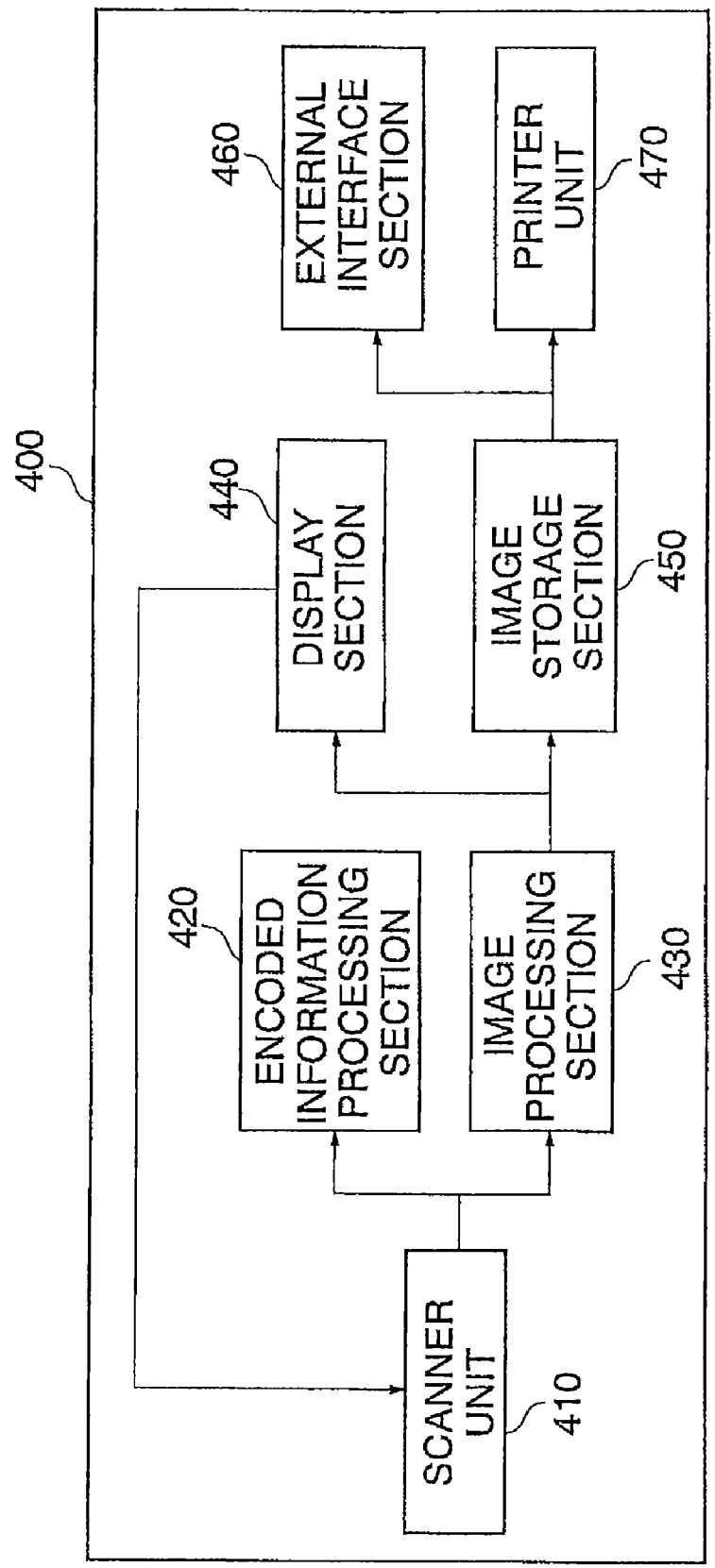
FIG. 4 is a block diagram of the configuration of an image processing apparatus according to a second embodiment of the present invention.

FIG. 4 is a block diagram of the configuration of an image processing apparatus according to a second embodiment of the present invention.

Referring to FIG. 4, the image processing apparatus 400 is configured as below.

A scanner unit 410 reads an image on one side of a sheet. An encoded information processing section 420 extracts encoded information from image data of the read image and analyzes the extracted information. When information to be updated whenever copying is performed, such as history information, is present, the encoded information processing section 420 extracts and updates the information.

An image processing section 430 performs various kinds of processing on the image data of the image read by the scanner unit 410. A display section 440 displays a message for prompting the user to invert the sheet and set the second side of the same on the scanner unit 410.

An image storage section 450 stores the image data processed by the image processing section 430. An external interface section 460 transmits the image data to an external apparatus. A printer unit 470 prints an image on the sheet based on the image data.

Figure 5A:
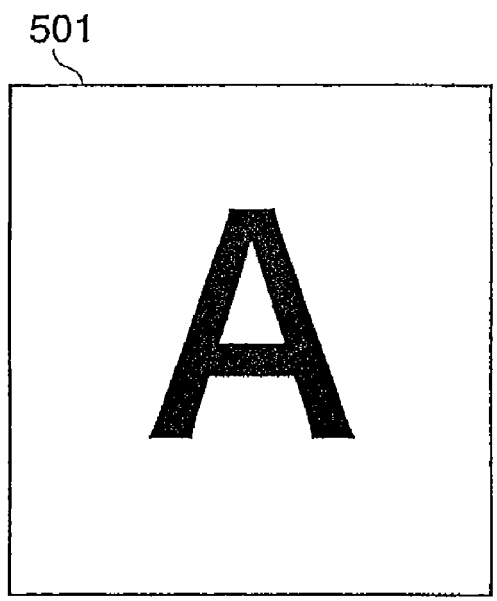
FIG. 5A is a view of an example of the front side of a sheet in the second embodiment.
Figure 5B:
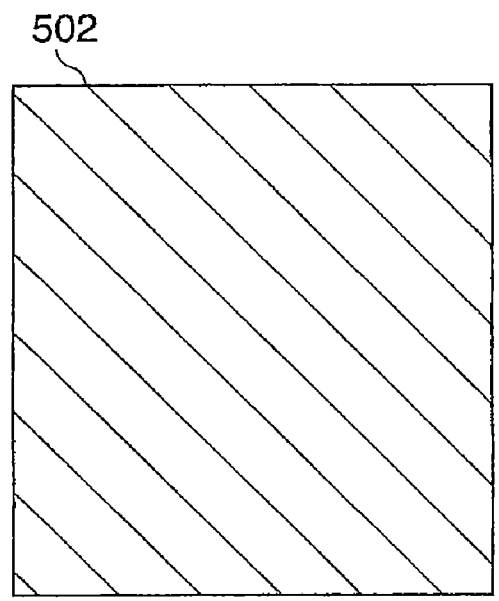
FIG. 5B is a view of an example of the back side of the sheet in the second embodiment.

FIGS. 5A and 5B are views illustrating examples of the respective front and back sides of a sheet in the second embodiment.

Referring to FIG. 5A, the front side 501 of the sheet not only has a print image "A" thereon, but also contains encoded information. The encoded information has a "front/back flag" indicating that encoded information is also embedded in an opposite side of the sheet from a scanned side of the same. Further, the encoded information has "copy restriction information" indicating that copying of the sheet is restricted. The amount of information contained in the front side 501 is smaller than that in the back side 502.

The back side 502 of the sheet shown in FIG. 5B contains encoded information. The encoded information has a "front/back flag" indicating that encoded information is also embedded in an opposite side of the sheet from a scanned side of the same. Further, the encoded information has "copy restriction information" indicating that copying of the sheet is restricted. Furthermore, the encoded information has "copy restriction detail information" indicative of copy restriction-related detailed information including copy restriction removal information indicative of conditions for removing copy restriction. The amount of information contained in the back side 502 is larger than that in the front side 501.

Although in the present embodiment, the front side has the print image and the back side doesn't, this may be reversed, or each side may have a print image. Further, the encoded information may contain other kinds of information than the above-mentioned information.

Figure 6A:
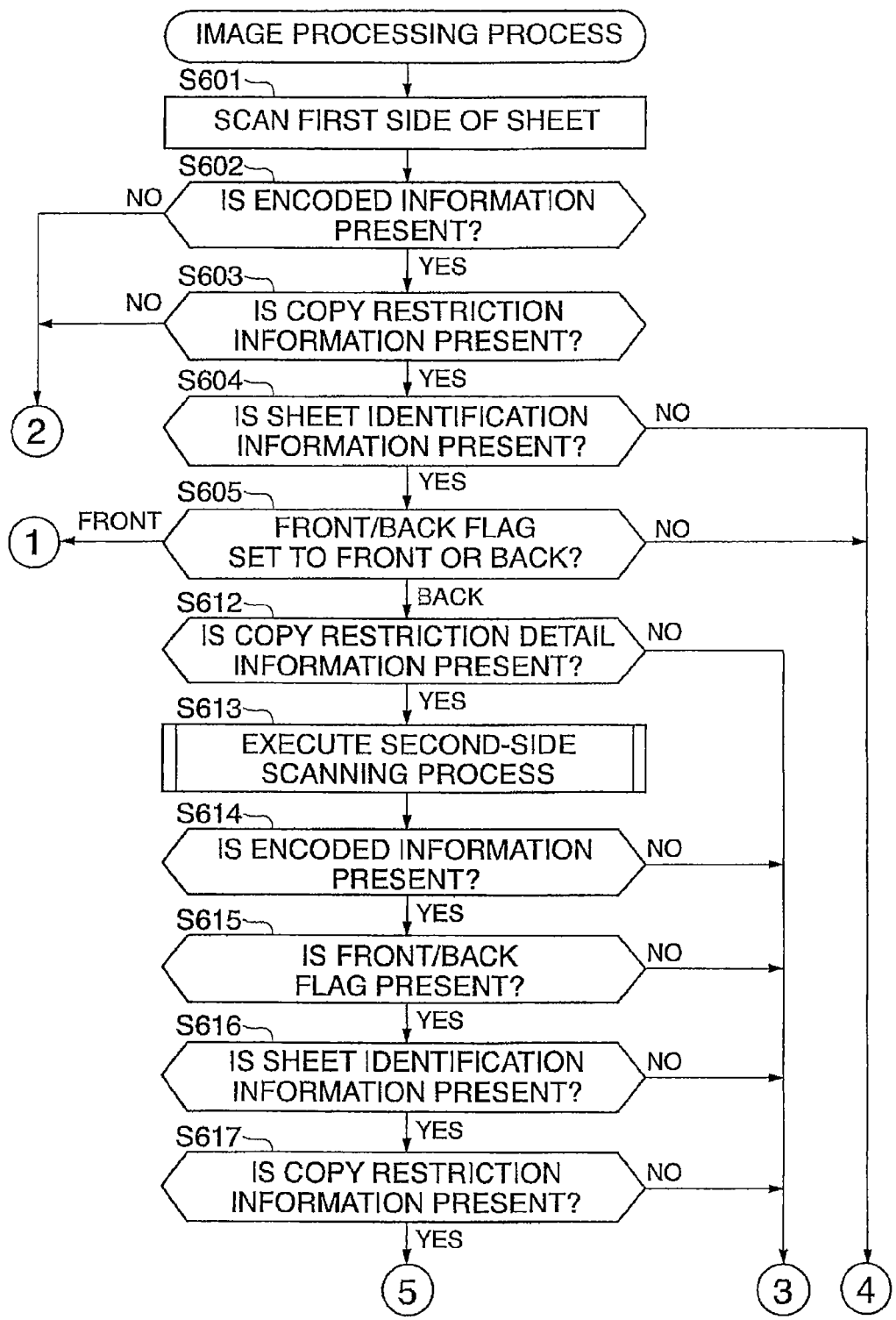
FIGS. 6A and 6B are a flowchart of an image processing process executed by the image processing apparatus in FIG. 4.
Figure 6B:
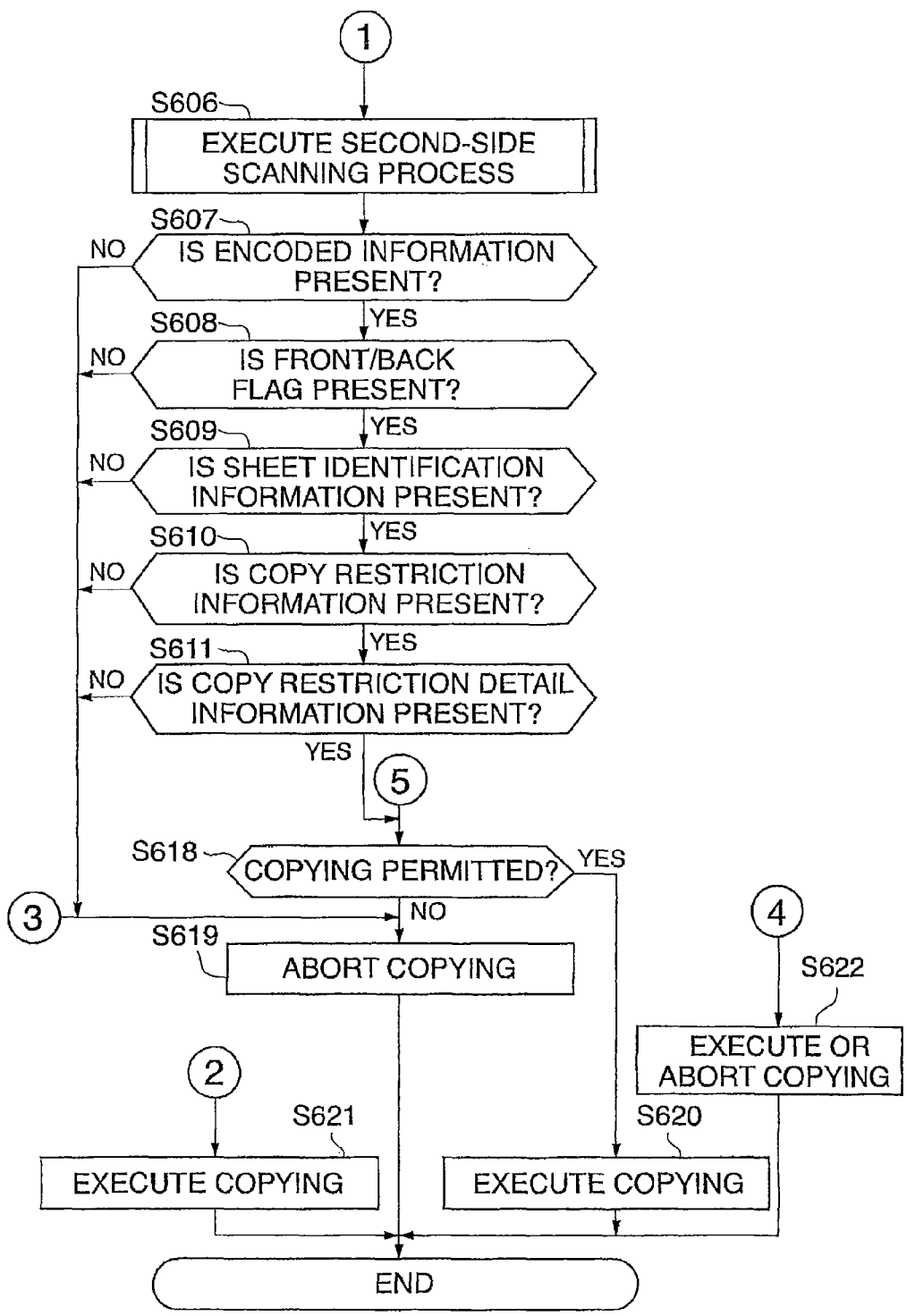

FIGS. 6A and 6B are a flowchart of an image processing process executed by the image processing apparatus in FIG. 4.

Referring to FIG. 6A, the present process is started in a step S601. In the step S601, the scanner unit 410 scans a first side of a sheet to thereby obtain image data.

In a step S602, the encoded information processing section 420 determines whether or not encoded information is embedded in an image represented by the image data obtained by the scanner unit 410. If no encoded information is embedded in the image, the process proceeds to a step S621, whereas if encoded information is, the process proceeds to a step S603.

In the step S603, the encoded information processing section 420 extracts the encoded information from the image data and analyzes the extracted encoded information to thereby determine whether or not copy restriction information is contained in the encoded information. If no copy restriction information is contained in the encoded information, the process proceeds to the step S621, whereas if copy restriction information is contained, the process proceeds to a step S604.

In the step S604, the encoded information processing section 420 determines whether or not sheet identification information is contained in the encoded information. If the sheet identification information is not contained in the encoded information, the process proceeds to a step S622, whereas if the sheet identification information is contained, the process proceeds to a step S605.

In the step S605, the encoded information processing section 420 determines whether or not the "front/back flag" is contained in the encoded information. If the "front/back flag" is not contained in the encoded information, the process proceeds to the step S622, whereas if the "front/back flag" is contained in the encoded information and is found to be set to "front", the process proceeds to a step S606. If the "front/back flag" is contained in the encoded information and is found to be set to "back", the process proceeds to the step S612.

Figure 7:
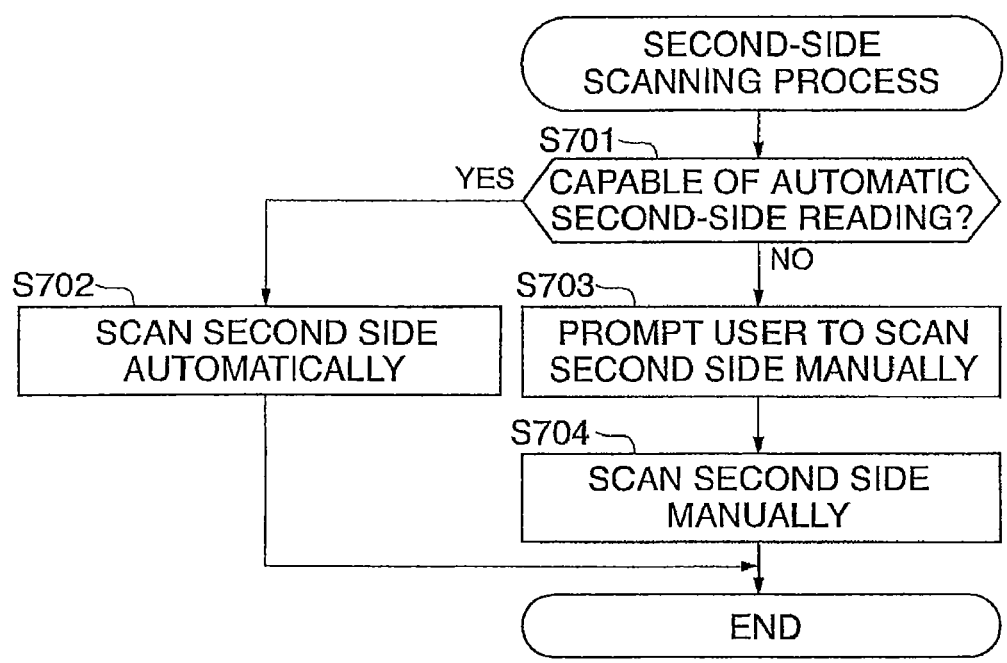
FIG. 7 is a flowchart of a second-side scanning process executed in a step S606 in FIG. 6B or a step S613 in FIG. 6A.

In the step S606, a second-side scanning process shown in a flowchart in FIG. 7 is executed. This process will be described in detail hereinafter. After execution of the second-side scanning process, the process proceeds to a step S607.

In the step S607, the encoded information processing section 420 determines whether or not encoded information is contained in an image on the second side. If no encoded information is contained in the image on the second side, the process proceeds to a step S619, whereas if encoded information is contained, the process proceeds to a step S608.

In the step S608, the encoded information processing section 420 determines whether or not the "front/back flag" is contained in the encoded information embedded in the image on the second side. If the "front/back flag" is not contained in the encoded information, the process proceeds to the step S619, whereas if the "front/back flag" is contained, the process proceeds to a step S609.

In the step S609, the encoded information processing section 420 determines whether or not sheet identification information is contained in the encoded information embedded in the image on the second side. If the sheet identification information is not contained in the encoded information, the process proceeds to the step S619, whereas if the sheet identification information is, the process proceeds to a step S610.

In the step S610, the encoded information processing section 420 determines whether or not copy restriction information is contained in the encoded information embedded in the image on the second side. If no copy restriction information is contained in the encoded information, the process proceeds to the step S619, whereas if copy restriction information is contained, the process proceeds to a step S611.

In the step S611, the encoded information processing section 420 determines whether or not copy restriction detail information is contained in the encoded information embedded in the image on the second side. If no copy restriction detail information is contained in the encoded information, the process proceeds to the step S619, whereas if copy restriction detail information is contained, the process proceeds to a step S618.

In the step S612, the encoded information processing section 420 determines whether or not copy restriction detail information is contained in the encoded information embedded in the image on the first side. If no copy restriction detail information is contained in the encoded information, the process proceeds to the step S619, whereas if copy restriction detail information is contained, the process proceeds to a step S613.

In the step S613, the second-side scanning process shown in the flowchart in FIG. 7 is executed. This process will be described in detail hereinafter. After execution of the second-side scanning process, the process proceeds to a step S614.

In the step S614, the encoded information processing section 420 determines whether or not encoded information is contained in the image on the second side. If no encoded information is contained in the image on the second side, the process proceeds to the step S619, whereas if encoded information is contained, the process proceeds to a step S614.

In the step S615, the encoded information processing section 420 determines whether or not the "front/back flag" is contained in the encoded information embedded in the image on the second side. If the "front/back flag" is not contained in the encoded information, the process proceeds to the step S619, whereas if the "front/back flag" is contained, the process proceeds to a step S616.

In the step S616, the encoded information processing section 420 determines whether or not sheet identification information is contained in the encoded information embedded in the image on the second side. If the sheet identification information is not contained in the encoded information, the process proceeds to the step S619, whereas if the sheet identification information is contained, the process proceeds to a step S617.

In the step S617, the encoded information processing section 420 determines whether or not copy restriction information is contained in the encoded information embedded in the image on the second side. If no copy restriction information is contained in the encoded information, the process proceeds to the step S619, whereas if copy restriction information is contained, the process proceeds to a step S618.

In the step S618, the encoded information processing section 420 refers to the copy restriction information on the first side and the copy restriction information and the copy restriction detail information on the second side to thereby determine whether or not copying is permitted. Now, let it be assumed that the copy restriction detail information contains a copy restriction removal condition of removing copy restriction only when the user belongs to a specific department of the company. In this case, if the user belongs to the specific department, it is determined that copying is permitted, whereas if not, it is determined that copying is not permitted. Conditions for the determination may be diversified.

Further, when the first-side and second-side front/back flags referred to are both set to "front" or "back", there is a fear of an erroneous operation or illegal use of encoded information, and hence copying is not permitted. Similarly, when the first-side sheet identification information and the second-side sheet identification information do not agree with each other, there is also a fear of an erroneous operation or illegal use of encoded information, and hence copying is not permitted. If it is determined that copying is not permitted, the process proceeds to the step S619, whereas if copying is permitted, the process proceeds to a step S620.

In the step S619, the copying of the sheet is aborted, and the user is notified of the abortion of the copying via the operating panel or the like.

In the step S620, copying of the sheet is executed. The image data is stored in the image storage section 150 by execution of copying of the sheet, and then is sent to the external interface section 460 or the printer unit 470. The image data sent to the external interface section 160 is delivered to an external computer. On the other hand, when the image data is sent to the printer unit 170, an image is printed based on the image data. When the copy restriction information and the copy restriction detail information indicate that double-sided copying is permitted, double-sided copying is executed. When the copy restriction information and the copy restriction detail information indicate that only front-side copying is permitted, only front-side copying is executed. Thereafter, the present process is terminated.

In a case where the front/back flag is embedded in an image on the first side, whatever copy settings are configured by the user, double-sided scanning is performed. Further, Nin1 processing is canceled based on copy restriction information.

In the step S621, since no encoded information is contained in the image, or since copying is not restricted though encoded information is contained in the image, copying of the sheet is executed. When the user has set double-sided copying, double-sided copying is executed, while when the user has set single-sided copying, single-sided copying is executed. Then, the present process is terminated.

In the step S622, since embedding of encoded information in both sides of the sheet, as proposed by the present invention, is not effected, the copying or the cancellation of the copying is executed based on the copy restriction information. Then, the present process is terminated. It should be noted that copy restriction information is not necessarily required to be embedded in the second side (back side) of a sheet. Therefore, it may be configured, for example, that if it is determined in the step S605 that the "front/back flag" is not contained in the encoded information, it may be further determined whether or not information indicative of a specific page is contained in the encoded information, and if the information is contained, copy restriction information may be read from an image on the specific page, whereas if not, the process may proceed to the step S622.

FIG. 7 is the aforementioned flowchart of the second-side scanning process executed in the step S606 in FIG. 6B or the step S613 in FIG. 6A.

As shown in FIG. 7, the present process is started in a step S701. In the step S701, it is determined whether or not the image processing apparatus has a function of automatically reading the second side. If the image processing apparatus has the function, the process proceeds to a step S702, whereas if not, the process proceeds to a step S703.

In the step S702, the scanner unit 410 automatically scans the second side to thereby obtain image data.

In the step S703, the display section 440 of the image processing apparatus displays a message for prompting the user to manually set the second side on the scanner unit 410.

In a step S704, the user manually sets the second side, and the scanner unit 410 scans the second side to thereby obtain the image data.

Next, a description will be given of encoded information. LVBC (Low Visibility Barcodes) will be described as a suitable example for the encoded information embedding technique according to the present invention.

A term "information embedding means" used in the present embodiment refers to a means for printing not only an original image to be printed but also systematically added desired information, on a recording medium (hereinafter referred to as "the sheet"), such as a sheet or an OHP sheet.

General requirements for information embedding means are as follows:

To be capable of realizing data embedding in a sheet, so as to embed a sufficient amount of information required for information embedding in the sheet.

To be capable of reliably extracting the information embedded in the sheet using a color material (toner or ink), afterwards as digital information.

When executing copying of an image on an original on a sheet, to be somewhat resistant against impediments to extraction of information, such as rotation of the original, enlargement, reduction, or partial deletion of the image, attenuation of a signal due to copying, stains, etc.

To have a real-time property which enables extraction of information during a copying operation, or a high-speed property substantially conforming to the real-time property, so as to prevent unauthorized copying of an original.

The LVBC in the present embodiment satisfies the above-mentioned requirements.

Figure 8A:
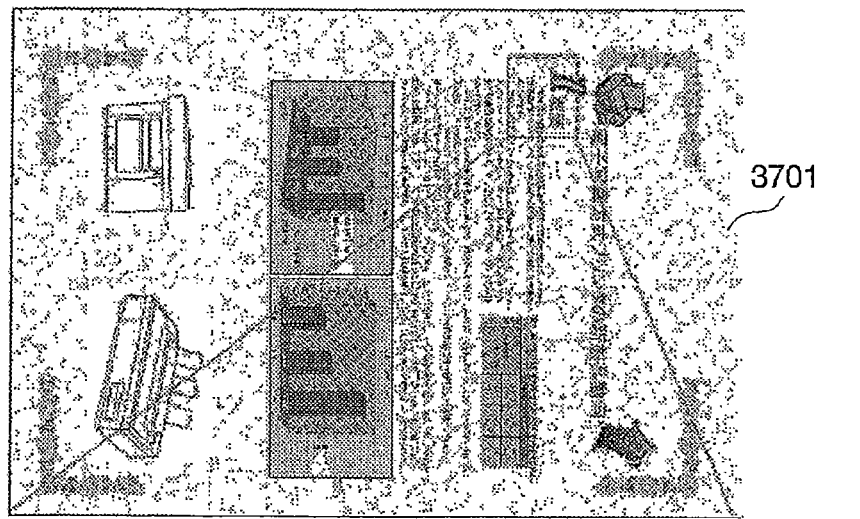
FIG. 8A is an image view showing an example of an original having LVBC embedded therein.
Figure 8B:
FIG. 8B is a partial enlarged view of FIG. 8A.

FIG. 8A is an image view showing an example of an original having the LVBC embedded therein, and FIG. 8B is a partial enlarged view of FIG. 8A.

Reference numeral 3701 designates an entire sheet, and 3702 the enlarged view. In the enlarged view 3702, there are shown not only an image originally drawn in the original, but also numerous dots (designated e.g. by reference numeral 3703) embedded seemingly at random. Information to be added is embedded in these dots.

Next, first areas and second areas will be described as areas in which additional information is to be embedded.

FIG. 9 is a table useful in explaining differences in characteristics between the first area and the second area.

The additional information is allocated to areas of two kinds having respective different characteristics, according to uses, and is embedded in the respective areas such that they can be separately extracted.

The first areas store information, such as copy restriction information indicative of inhibition of copying, which is required to be extracted at a high speed during a copying operation by normal scanning. Any original is unexceptionally subjected to extraction processing, and hence delay of the extraction processing affects the speed of a whole copying operation.

Therefore, analysis processing requires the same speed as that of scan processing, for example. On the other hand, a very small amount of information suffices to inhibit copying, and hence additional information to be embedded can have a small data size.

Tracking information, copy restriction detail information, and so forth are embedded in the second areas. The tracking information is extracted during analysis processing executed by an administrator when information leakage is detected, and hence extraction of the tracking information is not required during normal copying operation.

Therefore, delay of extraction processing does not necessarily affect the speed of a whole copying operation even if the real-time property is not ensured, but reduction of the extraction speed is tolerated to some extent. As for tracking information, it is required to embed a large amount of information, and hence the tracking information necessitates a relatively large data size.

Information embedded as tracking information can include the personal name of a user who prepared the original, the name of an organization to which the user belongs, and the machine number, IP (Internet Protocol) address, and MAC (Media Access Control) address of an apparatus which performed image formation. Further, the tracking information may include a place where the apparatus is installed, and printing date/time specifying when printing was performed.

The LVBC in the present embodiment makes it possible to embed additional information in the first areas and the second areas arranged in a mixed state, so as to satisfy the above-mentioned different requirements. This makes it possible to selectively perform extraction of information only from the first areas, extraction of information only from the second areas, or extraction of information from both the first areas and the second areas. At the same time, in a case where information is extracted only from the first areas, analysis speed is increased to thereby enable extraction processing to be performed at a speed which does not affect the productivity of copying operation.

Figure 10:
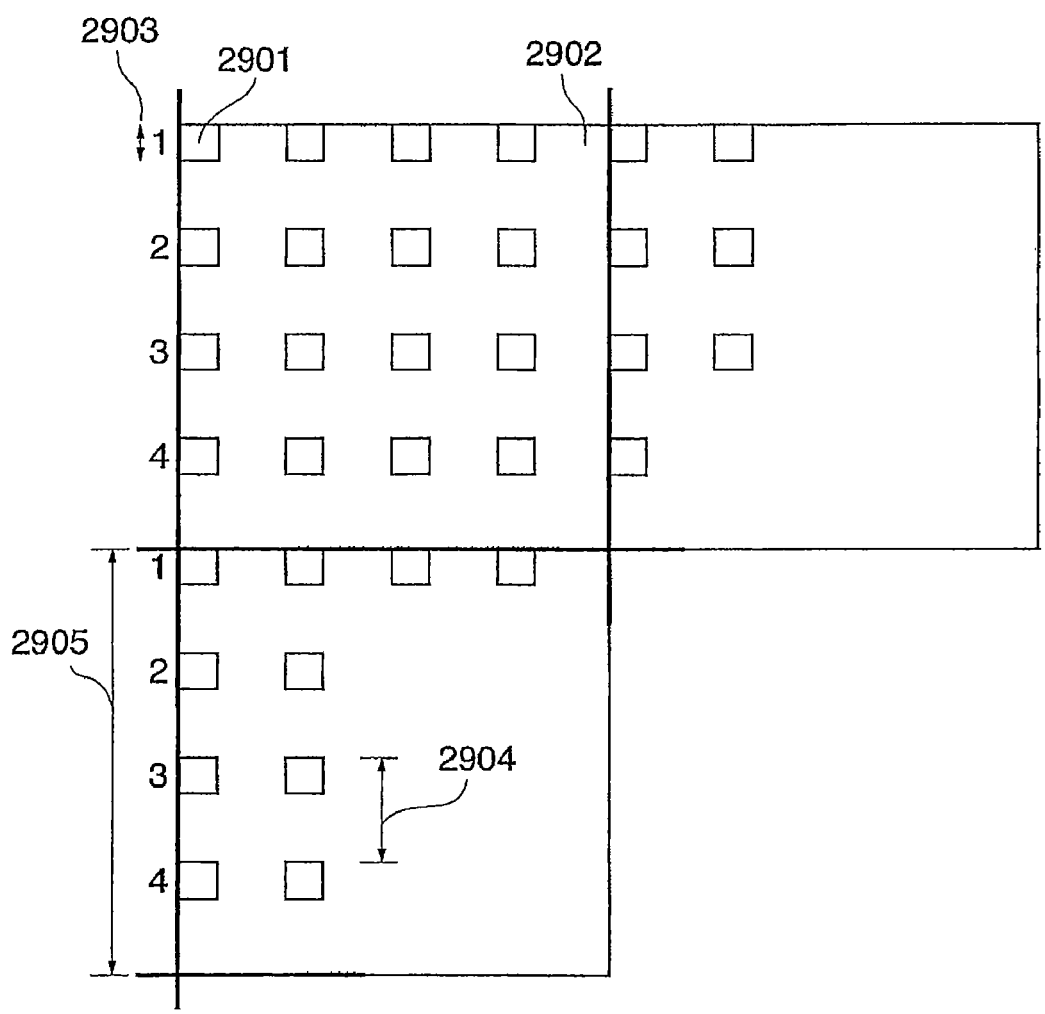
FIG. 10 is a schematic view of the arrangement of the first areas and the second areas for information embedding in a sheet.

FIG. 10 is a schematic view of the arrangement of the first areas and the second areas for information embedding in a sheet.

First areas 2901 having a square shape are embedded at predetermined space intervals, and all of them store the same data. The first areas 2901 are repeatedly embedded a plurality of times, whereby redundancy is increased and reliability against noise and error is improved.

Similarly, second areas 2902 are embedded at predetermined space intervals. Information written in the second areas 2902 is never written in the first areas 2901, but the two kinds of information are exclusively written in the respective kinds of areas. Reference numeral 2903 designates the size of each first area 2901, reference numeral 2904 a space interval at which the first areas 2901 are embedded, and reference numeral 2905 the size of each second area 2902.

Next, a description will be given of an LVBC embedding method.

In the LVBC embedding method, not only an image to be printed on a sheet, but also a dot pattern called a grid is printed so as to embed additional information.

Referring to FIG. 8B, the dots 3703 constitute the grid. The grid is a combination of dots vertically and horizontally arranged at equal space intervals. When the dots disposed on the grid are connected with shortest distances by respective imaginary lines (guide lines), there appear an imaginary grid pattern formed by the imaginary lines vertically and horizontally drawn at predetermined space intervals.

Additional information is input as binary data which is not larger than a predetermined size. Information embedding is realized by displacing each dot for additional information with respect to (from the center of) the associated one of the dots (grid points) constituting the grid, vertically, horizontally, or diagonally, i.e. in one of eight directions.

Figure 11:
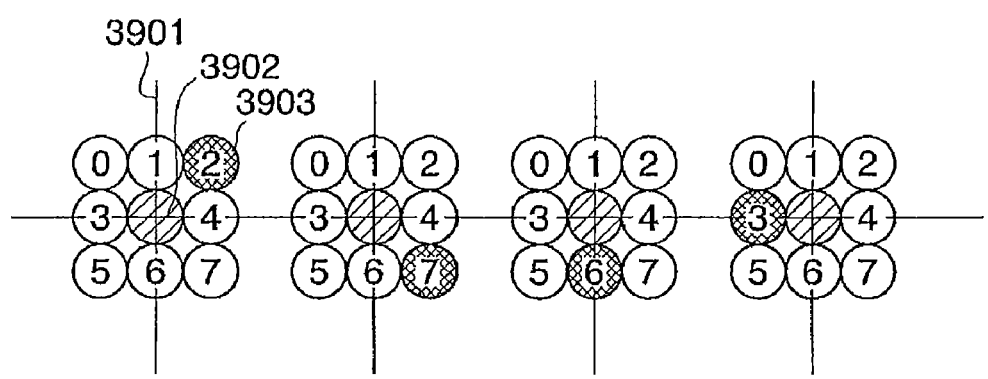
FIG. 11 is a view showing, by way of example, a case where binary data of 010111110011b is embedded as additional information.

FIG. 11 is a view showing, by way of example, a case where binary data of 010111110011b is embedded as additional information.

Referring to FIG. 11, vertical and horizontal lines 3901 are the imaginary guide lines determining the positions of the respective grid points. When the grid points are connected to each other by the vertical and horizontal lines 3901 with a shortest distance as mentioned above, the grid pattern appears. Reference numeral 3902 designates a center, where no dot for additional information is disposed. In actuality, a dot is displacedly disposed e.g. at a location designated by reference numeral 3903, which is away from the center 3902.

The data of 010111110011b is decomposed into 3-bit groups, i.e. 010, 111, 110, and 011. Further, the 3-bit groups are subjected to decimal conversion to be converted into 2, 7, 6, and 3, respectively.

As shown in FIG. 11, each dot for additional information is displaced with respect to the associated one of the dots constituting the grid as the center, vertically, horizontally, or diagonally, i.e. in one of the eight directions in a manner associated with a numerical value, whereby the additional information can be represented. In this case, the respective pieces of information of the numerical values 2, 7, 6, and 3 can be embedded by displacing the respective dots right upward, right downward, downward, and leftward, respectively.

When the LVBC is used, it is possible to embed additional information of approximately 2000 bytes in a sheet by repeatedly carrying out the above-described processing. Further, by embedding dots representing additional information in the sheet a plurality of times, it is possible to increase redundancy to thereby improve reliability against erroneous image recognition and stains, creases, or partial breakage of the sheet. This will be explained in detail hereinafter in a description of the LVBC analysis method.

It should be noted that in the case of analyzing LVBC, it is required to accurately grasp the respective positions of grid points, and it is preferred that dot displacements in the eight directions occur with equal probability. However, it is sometimes desired that lots of specific data representative of e.g. 0 are contained in the embedded data. In such a case, dot displacements in the eight directions cannot occur with equal probability unless further processing is executed.

To solve this problem, in the present embodiment, reversible scrambling (e.g. shared key encryption processing) is performed on additional information to randomize dot displacement, whereafter the additional information is embedded in a sheet.

LVBC embedding is a digital-to-analog conversion in which additional information as digital data is recorded on a sheet as analog data, and hence it is possible to realize the same with a relatively simple mechanism.

Information embedding in the aforementioned two kinds of areas is performed by application of the embedding method described above. The first areas 2901 and the second areas 2902 in FIG. 10 are synthesized in timing synchronous with formation of additional information to be embedded.

In this case as well, since the results of synthesis are handled as one set of embedded data, there is no difference in that information is embedded by converting the same into displacement of each dot. If the two areas are expanded to show individual dots it will be understood that information is embedded by displacement of each dot as illustrated in FIG. 11.

Next, a description will be given of the LVBC analysis method.

Figure 12:
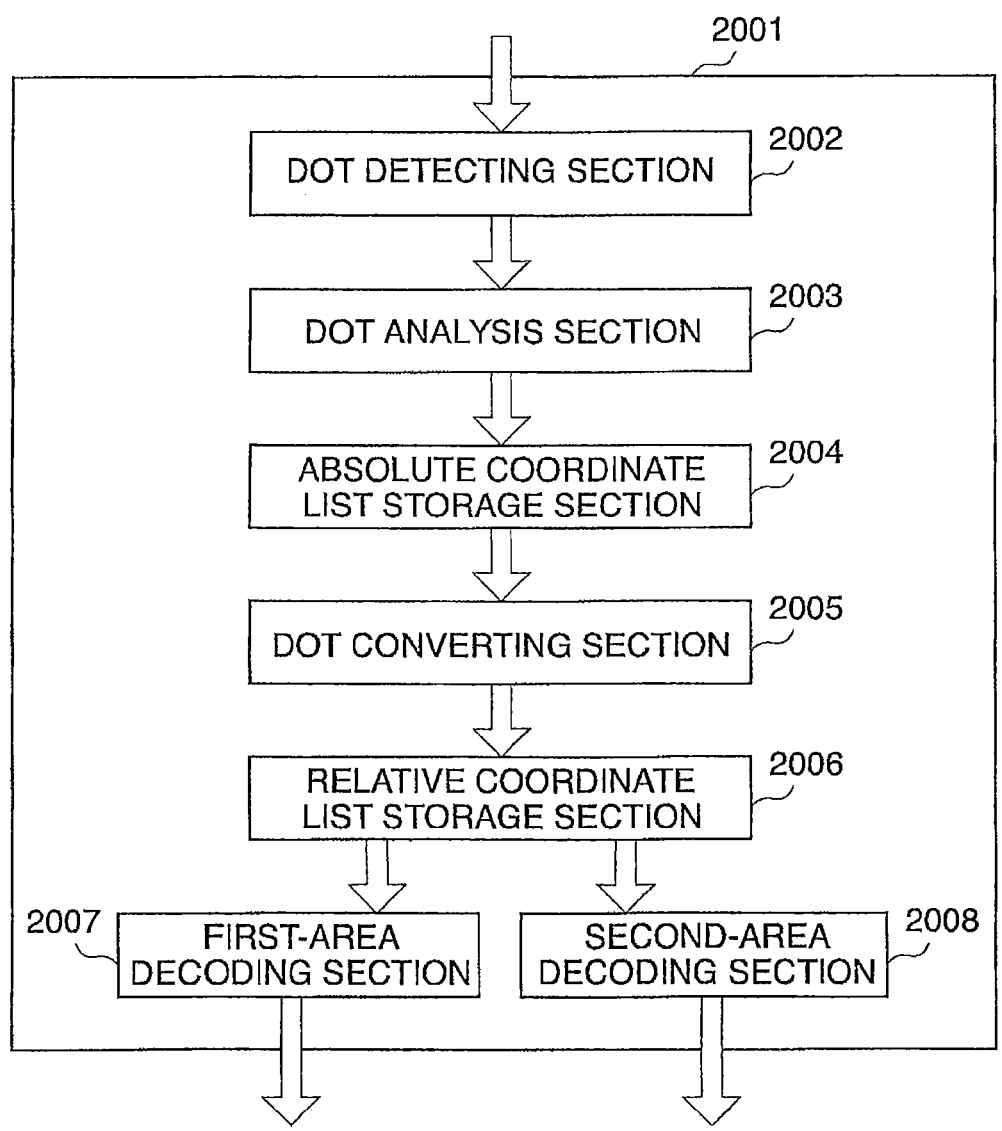
FIG. 12 is a block diagram of an embedded information analysis section that performs LVBC analysis.

FIG. 12 is a block diagram of an information analysis section that performs LVBC analysis.

As shown in FIG. 12, the information analysis section is configured as follows:

A dot detecting section 2002 extracts predetermined dots from an image having additional information embedded therein (i.e. a mixture of an original image and additional information) and converts each of the extracted dots into coordinates. A dot analysis section 2003 eliminates unnecessary dots, such as dots constituting halftone, from the dots detected by the dot detecting section 2002.

An absolute coordinate list storage section 2004 stores a list of the absolute coordinates of a plurality of dots output by the dot analysis section 2003 as results of analysis. A dot converting section 2005 detects rotational angles and grid spacing (intervals of grid points) from the absolute coordinate list stored in the absolute coordinate list storage section 2004, and converts the coordinates of each dot output from the dot analysis section 2003 into relative coordinates with respect to an associated grid-point position.

A relative coordinate storage section 2006 stores the relative coordinates of each dot analyzed by the dot converting section 2005 with respect to the associated grid-point position. A first-area decoding section 2007 extracts first-area portions of embedded additional information and outputs the extracted portions to a latter stage, while a second-area decoding section 2008 extracts second-area portions of the embedded additional information and outputs the extracted portions to the latter stage.

The "latter stage" mentioned above is intended to mean a function module that operates using the additional information, e.g. a function module that stops printing when copying inhibiting information is extracted as additional information or displays sheet owner information on the operating panel when tracking information is extracted.

The present invention can also be applied to other cases than the first and second embodiments insofar as encoded information contains information corresponding to the double-sided flag or the front/back flag and the encoded information is embedded in each of the two sides of a sheet.

Further, although in the first and second embodiments, the LVBC is used as encoded information, the present invention can also be applied to a case where encoded information of a different type from the LVBC is used.

According to the present invention, it is possible to embed encoded information, which is small in the amount of information, in the first side of the sheet, and embed encoded information, which is large in the amount of information, in the second side of a sheet, whereby even when the first side does not have a sufficient empty area, it is possible to use the second side in place of the first side to embed encoded information.

Further, encoded information is embedded in each of the front and back sides of a sheet, and at the same time, the encoded information contains information indicating that the encoded information is embedded in each of the two sides. This enables the image processing apparatus to automatically determine whether or not double-sided scanning is necessitated by referring to the information. Thus, even when a document mixedly contains single-sided originals and double-sided originals, it is possible to efficiently scan the originals without putting a burden on the user.

Furthermore, since copy restricting information is embedded in each of the front and back sides of a sheet in an encoded state, it is possible to prevent only one side of the sheet from being illegally copied, and therefore the same security level as in a case where encoded information is embedded only in the front side of a sheet can be maintained. According to the present invention, since information indicating which of the front and back sides of a sheet has been scanned and sheet identification information are embedded in an encoded state, it is possible to permit copying only when the front and back sides are properly scanned. This makes it possible to realize a very high level of security.

It is to be understood that the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-052920 filed Mar. 2, 2007, which is hereby incorporated by reference herein in its entirety.

What is claimed is:

1. An image processing apparatus comprising:
a reader unit configured to read an image on a first side of a sheet;
a processing unit configured (i) to judge whether or not embedded information is present in the image on the first side of the sheet,
(ii) to judge whether or not copy restriction information indicative of copy restriction is present in the image on the first side of the sheet, and
(iii) to judge whether or not double-sided information indicating that embedded information is present on both sides of the sheet is present in the image on the first side of the sheet; and
a copying unit,
wherein said reader unit is configured to operate to read an image on a second side of the sheet when said processing unit (i) judges that embedded information is present in the image on the first side of the sheet, (ii) judges that the copy restriction information is present in the image on the first side of the sheet, and (iii) judges that the double-sided information is present in the image on the first side of the sheet,
wherein said processing unit is configured to judge, when said reader unit operates to read an image on the second side of the sheet, (i) whether or not embedded information is present in the image on the second side of the sheet, (ii) whether or not copy restriction information indicative of copy restriction is present in the image on the second side of the sheet, (iii) whether or not copy restriction removal information indicative of a condition for removing the copy restriction is present in the image on the second side of the sheet, and (iv) whether or not double-sided information indicating that embedded information is present in both sides of the sheet is present in the image on the second side of the sheet,
wherein said processing unit is configured to determine, when it is judged that embedded information, copy restriction information, copy restriction removal information, and double-sided information are present in the image on the second side of the sheet, whether or not copying is permitted, based on the copy restriction removal information, and
wherein said copying unit is configured to operate, when said processing unit determines that copying is permitted, to perform printing based on the image read by said reader unit on the first side of the sheet or on the second side of the sheet.

2. A control method for an image processing apparatus, comprising:
a first reading step of reading an image on a first side of a sheet using the image processing apparatus;
a first judgment step of judging, in the image processing apparatus, whether or not embedded information is present in the image read in said first reading step;
a second judgment step of judging, in the image processing apparatus, whether or not copy restriction information indicative of copy restriction is present in the image read in said first reading step;
a third judgment step of judging, in the image processing apparatus, whether or not double-sided information indicating that embedded information is present on both sides of the sheet is present in the image read in said first reading step;
a second reading step of reading an image on a second side of the sheet, using the image processing apparatus, when (i) it is determined in said first judgment step that embedded information is present, (ii) it is determined in said second judgment step that the copy restriction information is present, and (iii) it is determined in said third judgment step that the double-sided information is present;
a fourth judgment step of judging, in the image processing apparatus, whether or not embedded information is present in the image read in said second reading step;
a fifth judgment step of judging, in the image processing apparatus, whether or not copy restriction information indicative of copy restriction is present in the image read in said second reading step;
a sixth judgment step of judging, in the image processing apparatus, whether or not copy restriction removal information indicative of a condition for removing the copy restriction is present in the image read in said second reading step;
a seventh judgment step of judging, in the image processing apparatus, whether or not double-sided information indicating that embedded information is present in both sides of the sheet is present in the image read in said second reading step;
a determination step of determining in the image processing apparatus, based on the copy restriction removal information, whether or not copying is permitted, when (i) it is determined in said fourth judgment step that embedded information is present, (ii) it is determined in said fifth judgment step that the copy restriction information is present, (iii) it is determined in said sixth judgment step that copy restriction removal information is present in the image read in said second reading step, and (iv) it is determined in said seventh judgment step that the double-sided information is present; and
a copying step of performing printing using the image processing apparatus based on the image read in said first reading step or said second reading step, when it is determined in said determination step that copying is permitted.

3. A control program, embodied in a non-transitory computer-readable medium, for causing a computer to execute a control method for an image processing apparatus, the control method for the image processing apparatus comprising:
a first reading step of reading an image on a first side of a sheet using the image processing apparatus;
a first judgment step of judging, in the image processing apparatus, whether or not embedded information is present in the image read in said first reading step;

a second judgment step of judging, in the image processing apparatus, whether or not copy restriction information indicative of copy restriction is present in the image read in said first reading step;

a third judgment step of judging, in the image processing apparatus, whether or not double-sided information indicating that embedded information is present on both sides of the sheet is present in the image read in said first reading step;

a second reading step of reading an image on a second side of the sheet, using the image processing apparatus, when (i) it is determined in said first judgment step that embedded information is present, (ii) it is determined in said second judgment step that the copy restriction information is present, and (iii) it is determined in said third judgment step that the double-sided information is present;

a fourth judgment step of judging, in the image processing apparatus, whether or not embedded information is present in the image read in said second reading step;

a fifth judgment step of judging, in the image processing apparatus, whether or not copy restriction information indicative of copy restriction is present in the image read in said second reading step;

a sixth judgment step of judging, in the image processing apparatus, whether or not copy restriction removal information indicative of a condition for removing the copy restriction is present in the image read in said second reading step;

a seventh judgment step of judging, in the image processing apparatus, whether or not double-sided information indicating that embedded information is present in both sides of the sheet is present in the image read in said second reading step;

a determination step of determining in the image processing apparatus, based on the copy restriction removal information, whether or not copying is permitted, when (i) it is determined in said fourth judgment step that embedded information is present, (ii) it is determined in said fifth judgment step that the copy restriction information is present, (iii) it is determined in said sixth judgment step that copy restriction removal information is present in the image read in said second reading step, and (iv) it is determined in said seventh judgment step that the double-sided information is present; and a copying step of performing printing using the image processing apparatus based on the image read in said first reading step or said second reading step, when it is determined in said determination step that copying is permitted.

* * * * *